United States Patent
Graceffo et al.

(10) Patent No.: US 11,411,654 B1
(45) Date of Patent: Aug. 9, 2022

(54) METHOD FOR GENERATING A CONSTANT ENVELOPE WAVEFORM WHEN ENCODING MULTIPLE SUB CHANNELS ON THE SAME CARRIER

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/211,350

(22) Filed: Mar. 24, 2021

(51) Int. Cl.
*H04B 10/548* (2013.01)
*H04L 9/40* (2022.01)
*H04B 10/60* (2013.01)

(52) U.S. Cl.
CPC .......... *H04B 10/548* (2013.01); *H04B 10/60* (2013.01); *H04L 63/0428* (2013.01)

(58) Field of Classification Search
CPC ........................................ H04B 10/548–5563
See application file for complete search history.

(56) References Cited

U.S. PATENT DOCUMENTS

| | | |
|---|---|---|
| 4,495,477 A | 1/1985 | Weber |
| 4,750,192 A | 6/1988 | Dzung |
| 5,608,560 A | 3/1997 | Abram et al. |
| 7,187,871 B1* | 3/2007 | Kaushik .............. H04B 10/505 398/182 |
| 8,055,137 B2 | 11/2011 | Wang et al. |
| 9,018,575 B2 | 4/2015 | Kowalevicz et al. |
| 9,165,963 B2 | 10/2015 | Kowalevicz et al. |
| 9,171,219 B2 | 10/2015 | Kowalevicz |
| 9,323,034 B2 | 4/2016 | Dolgin |
| 9,400,414 B2 | 7/2016 | Kowalevicz |
| 9,451,185 B2 | 9/2016 | Dolgin et al. |
| 9,503,660 B2 | 11/2016 | Kowalevicz et al. |
| 9,509,411 B2 | 11/2016 | D'Errico |
| 9,535,245 B1 | 1/2017 | Kowalevicz |
| 9,538,096 B2 | 1/2017 | Dolgin |
| 9,887,779 B2 | 2/2018 | Kowalevicz |

(Continued)

FOREIGN PATENT DOCUMENTS

EP          3442187 A1      2/2019

OTHER PUBLICATIONS

International Search Report and Written Opinion in International Patent Application No. PCT/US2020/022354 dated Jun. 17, 2020.

*Primary Examiner* — Nathan M Cors
(74) *Attorney, Agent, or Firm* — Lando & Anastasi, LLP

(57) ABSTRACT

Communications systems and methods of controlling the same include generating and processing a constant envelope phase-modulated optical signal, the systems including an optical source configured to provide a carrier waveform, an encoding module configured to encode the data as a plurality of symbol sequences, a mapping module configured to convert the plurality of symbol sequences to a plurality of phase state changes and a plurality of directions according to a path-dependent phase modulation scheme, and a phase modulator configured to modulate the carrier waveform with the plurality of phase state changes and directions to generate the constant envelope phase-modulated optical signal.

18 Claims, 8 Drawing Sheets

(56) References Cited

U.S. PATENT DOCUMENTS

| | | |
|---|---|---|
| 9,929,813 B1 | 3/2018 | Batshon et al. |
| 9,973,281 B2 | 5/2018 | Kowalevicz et al. |
| 10,164,765 B2 | 12/2018 | Dolgin et al. |
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,340,965 B2 | 7/2019 | Dolgin et al. |
| 10,374,743 B2 | 8/2019 | Dolgin et al. |
| 10,378,880 B2 | 8/2019 | Dolgin et al. |
| 10,498,464 B2 | 12/2019 | Graceffo et al. |
| 10,530,494 B2 | 1/2020 | Dolgin et al. |
| 10,554,306 B1 * | 2/2020 | Graceffo .............. H04B 10/505 |
| 10,571,774 B2 | 2/2020 | Graceffo et al. |
| 10,637,580 B2 | 4/2020 | Dolgin et al. |
| 10,686,533 B2 | 6/2020 | Dolgin et al. |
| 10,714,251 B2 | 7/2020 | Dolgin et al. |
| 10,826,603 B1 | 11/2020 | Kowalevicz et al. |
| 10,924,189 B2 | 2/2021 | Kowalevicz et al. |
| 11,012,160 B2 | 5/2021 | Kowalevicz et al. |
| 11,101,896 B2 | 8/2021 | Kowalevicz et al. |
| 11,133,873 B1 | 9/2021 | Kowalevicz et al. |
| 11,159,244 B2 | 10/2021 | Graceffo et al. |
| 11,159,245 B2 | 10/2021 | Kowalevicz et al. |
| 11,258,516 B2 | 2/2022 | Graceffo et al. |
| 2008/0226300 A1 | 9/2008 | Mayer et al. |
| 2011/0274436 A1 | 11/2011 | McNicol et al. |
| 2012/0251129 A1 * | 10/2012 | Delfyett ............... H04B 10/505 398/188 |
| 2013/0216090 A1 * | 8/2013 | Zitzmann ........... H04N 1/32203 382/100 |
| 2018/0054259 A1 | 2/2018 | Kowalevicz et al. |
| 2018/0091227 A1 | 3/2018 | Dolgin et al. |
| 2018/0091228 A1 | 3/2018 | Kowalevicz et al. |
| 2018/0091230 A1 | 3/2018 | Dolgin et al. |
| 2018/0091232 A1 | 3/2018 | Dolgin et al. |
| 2018/0102853 A1 | 4/2018 | Dolgin et al. |
| 2018/0145764 A1 | 5/2018 | Dolgin et al. |
| 2018/0145765 A1 | 5/2018 | Kowalevicz et al. |
| 2018/0167145 A1 | 6/2018 | Dolgin et al. |
| 2018/0234231 A1 | 8/2018 | Dolgin et al. |
| 2018/0367223 A1 | 12/2018 | Graceffo et al. |
| 2019/0007091 A1 | 1/2019 | Graceffo et al. |
| 2019/0050956 A1 * | 2/2019 | Kossin ................. H04L 9/0891 |
| 2019/0158208 A1 | 5/2019 | Dolgin et al. |
| 2020/0136727 A1 | 4/2020 | Graceffo et al. |
| 2020/0371328 A1 | 11/2020 | Kowalevicz et al. |
| 2020/0403709 A1 | 12/2020 | Graceffo et al. |
| 2020/0409189 A1 | 12/2020 | Graceffo et al. |
| 2021/0006336 A1 | 1/2021 | Kowalevicz et al. |
| 2021/0021351 A1 | 1/2021 | Kowalevicz et al. |
| 2021/0021449 A1 | 1/2021 | Graceffo et al. |
| 2021/0041515 A1 | 2/2021 | Dolgin |
| 2021/0099232 A1 | 4/2021 | Graceffo et al. |
| 2021/0099234 A1 | 4/2021 | Graceffo et al. |
| 2021/0105073 A1 | 4/2021 | Graceffo et al. |
| 2021/0126715 A1 | 4/2021 | Graceffo et al. |
| 2021/0314071 A1 | 10/2021 | Graceffo et al. |
| 2022/0014276 A1 | 1/2022 | Kowalevicz et al. |

* cited by examiner

METHOD FOR GENERATING A CONSTANT ENVELOPE WAVEFORM WHEN ENCODING MULTIPLE SUB CHANNELS ON THE SAME CARRIER

BACKGROUND

Many optical communication systems manipulate light waves to carry information. For instance, often a light source (e.g., a laser source) is modulated to change various properties of emitted light, such as an amplitude, phase, or frequency of the light to convey information. Phase modulation, also called phase shift keying (PSK), is a commonly used communications technique in which information, in symbols, is encoded onto a carrier signal using phase changes.

SUMMARY OF INVENTION

Free Space Optical (FSO) communication systems and methods of controlling the same are provided in embodiments described herein. Such embodiments solve, among other problems, the problem of amplitude variation in the transmitted waveform when multiple data channels are summed together on a single wavelength, thereby maintaining a constant envelope transmitted waveform.

According to at least one embodiment, a communications system using a constant envelope phase-modulated optical signal comprises a transmitter comprising an optical source configured to provide a carrier waveform, an encoding module configured to encode data from a plurality of channels as a plurality of symbol sequences, a mapping module configured to convert the plurality of symbol sequences to a plurality of phase state changes and a plurality of directions according to a path-dependent phase modulation scheme, a phase modulator configured to modulate the carrier waveform with the plurality of phase state changes and directions to generate the constant envelope phase-modulated optical signal, and a lens that emits the constant envelope phase-modulated signal.

In one example, the mapping module is further configured to convert the plurality of symbol sequences to the plurality of phase state changes and the plurality of directions by summing the plurality of symbol sequences into a summed sequence of symbols, wherein each sequence of the plurality of sequences is of equal length.

In another example, the mapping module is further configured to convert the plurality of symbol sequences to the plurality of phase state changes and the plurality of directions by converting each symbol in the summed sequence of symbols to a phase state change and a direction included in the plurality of phase state changes and the plurality of directions.

In one example, the mapping module is further configured to determine the plurality of phase state changes and the plurality of directions by determining the total number of channels in the plurality of channels, where the total number of channels is N, calculating a sequence of N+1 discrete voltage amplitudes, the sequence of voltage amplitudes having the form V=[−N, −N+2, −N+4, . . . , −N+2N] symmetric about zero, including zero if N is even and excluding zero if N is odd, and multiplying each amplitude in the sequence of voltage amplitudes by (π/4) radians, where sgn(V) indicates a positive or negative phase rotation in a symbol constellation corresponding to the path-dependent phase modulation scheme.

In another example, the mapping module is further configured to convert the plurality of symbol sequences to the plurality of phase state changes and the plurality of directions by determining a plurality of positive and/or negative phase change rotations in a symbol constellation corresponding to the path-dependent phase modulation scheme.

In one example, the system further comprises an optical receiver comprising at least one optical resonator configured to receive the emitted constant envelope phase-modulated optical signal and provide an intensity-modulated signal indicative of the modulation of the emitted constant envelope phase-modulated optical signal.

In another example, the at least one optical resonator includes an etalon or a micro-ring.

In one example, the optical receiver further comprises an amplitude mapper configured to process the intensity-modulated signal into a received plurality of phase state changes and a received plurality of directions, and convert the received plurality of phase state changes and the received plurality of directions to an output including a plurality of amplitude changes.

In another example, the optical receiver further comprises a splitting module configured to, for each channel of the plurality of channels, multiply the output of the amplitude mapper by a unique code to produce a result, integrate the result, and scale the integrated result.

In one example, the encoding module encodes the data in each channel of the plurality of data channels using Code Division Multiple Access (CDMA), Walsh encoding, or maximal length sequences.

According to at least one embodiment, a communications method comprises the acts: providing a carrier waveform, encoding data from a plurality of channels as a plurality of symbol sequences, converting the plurality of symbol sequences to a plurality of phase state changes and a plurality of directions according to a path-dependent phase modulation scheme, modulating the carrier waveform with the plurality of phase state changes and directions to generate the constant envelope phase-modulated optical signal, and emitting the constant envelope phase-modulated optical signal.

In one example, converting the plurality of symbol sequences to the plurality of phase state changes and the plurality of directions comprises summing the plurality of symbol sequences into a summed sequence of symbols, wherein each sequence of the plurality of sequences is of equal length.

In another example, converting the plurality of symbol sequences to the plurality of phase state changes and the plurality of directions further comprises converting each symbol in the summed sequence of symbols to a phase state change and a direction included in the plurality of phase state changes and the plurality of directions.

In one example, converting the plurality of symbol sequences to the plurality of phase state changes and the plurality of directions further comprises determining the plurality of phase state changes and the plurality of directions by determining the total number of channels in the plurality of channels, where the total number of channels is N, calculating a sequence of N+1 discrete voltage amplitudes, the sequence of voltage amplitudes having the form: V=[−N, −N+2, −N+4, . . . , −N+2N] symmetric about zero, including zero if N is even and excluding zero if N is odd, and multiplying each amplitude in the sequence of voltage amplitudes by (π/4) radians, where sgn(V) indicates a positive or negative phase rotation in a symbol constellation corresponding to the path-dependent phase modulation scheme.

In another example, converting the plurality of symbol sequences to the plurality of phase state changes and the plurality of directions comprises determining a plurality of positive and/or negative phase change rotations in a symbol constellation corresponding to the path-dependent phase modulation scheme.

In one example, the method further comprises receiving the emitted constant envelope phase-modulated optical signal and providing an intensity-modulated signal indicative of the modulation of the emitted constant envelope phase-modulated optical signal.

In another example, processing the intensity-modulated signal into a received plurality of phase state changes and a received plurality of directions and converting the received plurality of phase state changes and the received plurality of directions to an output including a plurality of amplitude changes.

In one example, the method further comprises for each channel of the plurality of channels, multiplying the output by a unique code to produce a result, integrating the result, and scaling the integrated result.

In another example, encoding the data comprises encoding the data in each channel of the plurality of data channels using Code Division Multiple Access (CDMA), Walsh encoding, or maximal length sequences.

In one example, encoding the data comprises encrypting the data.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to systems and methods for encoding and transmitting a plurality of channels on a single wavelength optical signal with a constant envelope without introducing undesirable effects into the signal, such as latency errors or changes in the signal envelope (e.g., amplitude variations). The constant envelope of the transmitted signal ensures stability in the communication channel established between a transmitter and a receiver using a single wavelength.

The data transmitted on each of the plurality of channels (i.e., carriers) is encoded via one of a plurality of coding schemes. Embodiments described herein include encoding the plurality of channels using unique orthogonal codes including, but not limited to one of: Walsh codes, Maximal Length Sequences (MLS), Code Division Multiple Access (CDMA) codes, and Barker codes and sequences formed from partial sequences including Gold codes.

When unique codes are used to distinguish multiple carriers, as in CDMA systems, the encoded data is summed together for transmission and the voltage per aggregate bit changes from bit-to-bit, thereby creating variations in signal amplitude which creates variations in the carrier envelope. Significant technical challenges are incurred when trying to both amplitude and phase modulate an optical signal. Aspects and embodiments described herein provide a solution to the amplitude variation problem.

To achieve the constant envelope optical signal described above, certain aspects and embodiments utilize the Path Dependent Modulation (PDM) method described in the commonly-owned U.S. Pat. No. 10,554,306 B1, titled "CONSTANT ENVELOPE PATH-DEPENDENT PHASE MODULATION," which is herein incorporated by reference in its entirety for all purposes.

Figure 1:
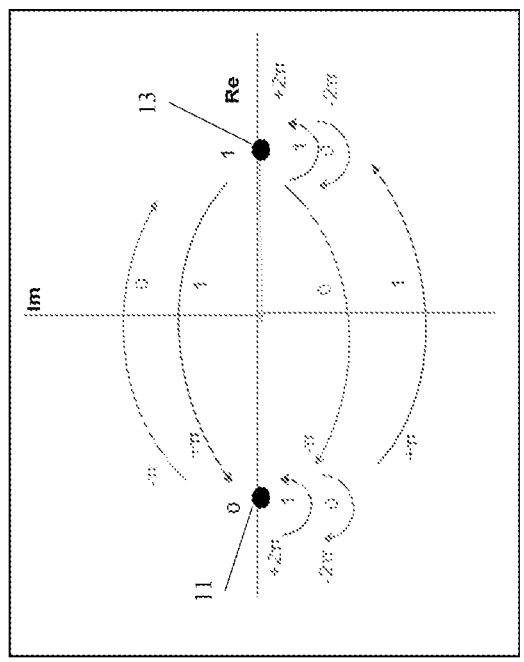
FIG. 1 is a diagram illustrating an example of an enhanced path-dependent Binary Phase Shift Keying (BPSK) symbol constellation and modulation scheme according to aspects and embodiments herein.

FIG. 1 is a diagram illustrating an example of a path-dependent modulation scheme according to certain aspects and embodiments. This example is explained using BPSK; however, those skilled in the art will appreciate, with the benefit of this disclosure, that the approach can be applied similarly to all M-ary and QAM modulation schemes and symbol constellations.

In the diagram of FIG. 1, the vertical axis is the imaginary axis (Im) and the horizontal axis is the real axis (Re). There are two symbols 11, 13 in the plane, both of which are located on the horizontal axis. The first symbol 13 located to the right of the origin is at a phase angle $\phi$ of 0 radians, while the second symbol 11 to the left of the origin is located at a phase angle of pi radians (180 degrees). The phase angle $\phi$ is determined by the rotation of a vector originating at the origin and pointing along the horizontal axes in the positive (towards the right in FIG. 1) direction. Such a vector rotating in the counter-clockwise direction constitutes a positive phase rotation. A vector rotating in a clockwise direction constitutes a negative rotation; in this case a rotation of –pi radians. In the examples shown in FIG. 1, it has been arbitrarily defined that a clockwise rotation is negative and a counter-clockwise rotation is positive. It has also been arbitrarily defined that the 1-State is on the positive side of the real axis and the 0-State is on the negative side of the real axis. Those skilled in the art will appreciate equivalent symbol constellations and modulation schemes.

TABLE 1

| Current State | Next Symbol | | | |
| --- | --- | --- | --- | --- |
|  | 00 | 01 | 10 | 11 |
| 0 | −2π | −π | +2π | +π |
| 1 | −π | −2π | +π | +2π |

In Table 1, the first column represents the current system state or diagram location. A zero in the first column represents location bit zero at a phase angle of pi radians (11). A one in the first column represents a location bit of one at a phase angle of zero radians (13). The horizontal header [00 01 10 11] represents the symbol value as a function of destination phase state and path to the destination state. The Next Symbol values represent the direction and degree of rotation in radians that are used to generate a particular symbol value. According to one embodiment, Table 1 is used as follows: If the current state is 0 and the next bit pair to be transmitted is 00 then rotate the phase −2pi back to State 0. If the current state is 0 and the next bit pair to be transmitted is 01 then rotate the phase −pi to State 1. If the current state is 0 and the next bit pair to be transmitted is 10 then rotate the phase 2pi back to State 0.

To differentiate between a positive phase rotation and a negative phase rotation in a received constant envelope optical signal according to certain embodiments, an optical resonator is used with a PDM method. In an example, an etalon is used to determine the amount of phase change in an optical signal and the direction of phase change in the optical signal. Using the PDM method provides an extra bit of information with each phase change. A more detailed description of optical resonators and etalon used in embodiments described herein is provided in subsequent sections below.

Figure 2:
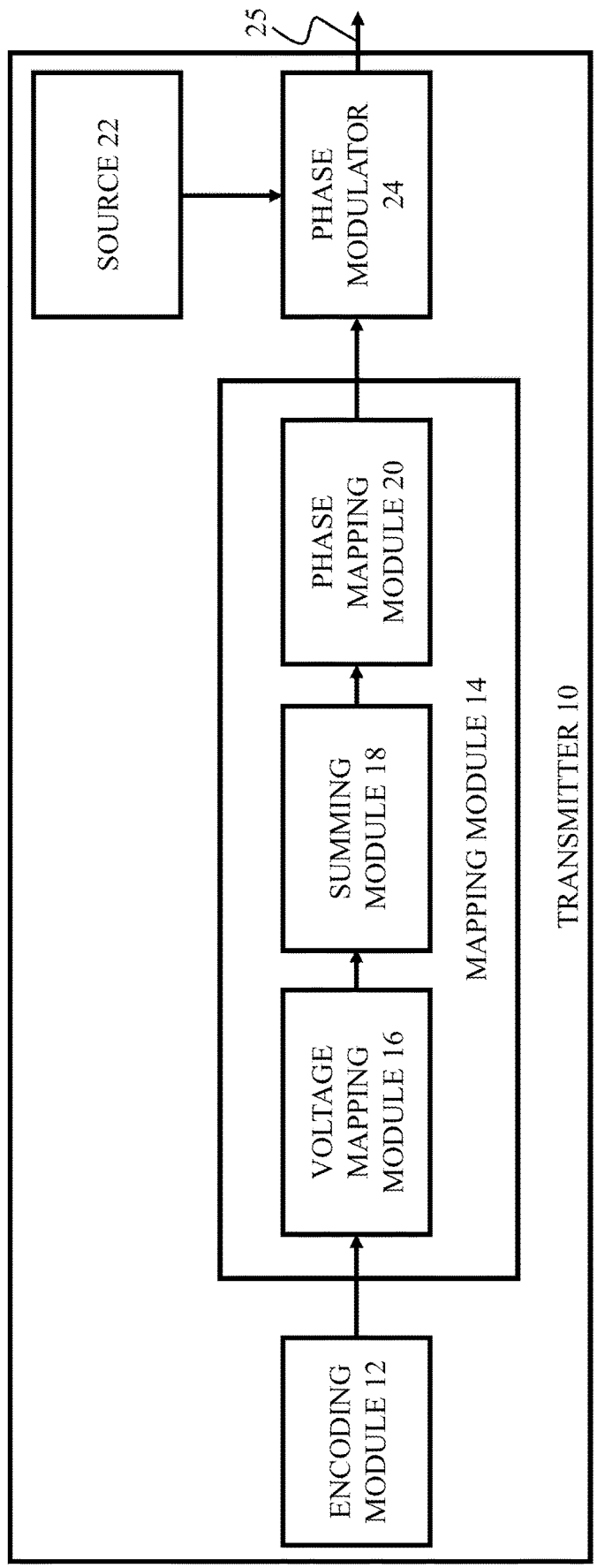
FIG. 2 is a functional block diagram of one example of a transmitter according to aspects and embodiments herein.

FIG. 2 shows a transmitter 10 which includes an encoding module 12, a source 22, a phase modulator 24, and a mapping module 14 which includes a voltage mapping module 16, a summing module 18, and a phase mapping module 20. The encoding module 12 is coupled to the voltage mapping module 16 and configured to receive data in each of a plurality of channels, and encode the data as a plurality of symbol sequences. In one example, the encoding module 12 is a standard shift requester configuration. Each channel has a data set and a unique channel code. In an example, a unique channel code is applied to each carrier. The data set is a series of ones and/or zeroes (i.e., bits). In one embodiment, the encoding module 12 includes an encoder for each channel for the plurality of channels, and each encoder outputs encoded data as a series of bits. The encoded data of the plurality of channels is then passed to the voltage mapping module 16, which converts the encoded data of each channel from a logical representation to a series of voltages. In an example, a 1-bit maps to −1 Volt and a 0-bit maps to 1 Volt. In another example, a 1-bit maps to 1 Volt and a 0-bit maps to −1 Volt. To encrypt the encoded data, in one example, the encoded data is used as an index/key to retrieve a corresponding codeword when the encoded data is decoded at a receiver.

In at least one embodiment of the phase mapping module 20, the voltage from the summing module 18 is provided to an analog-to-digital converter (ADC), which provides a digital output to a microprocessor. The microprocessor uses a lookup table (LUT) indexed by voltage magnitude and sign, and outputs phase and direction as a voltage to the phase modulator 24.

The voltage mapping module 16 is coupled to the summing module 18, which receives the series of voltages in each channel of the plurality of channels and adds each voltage in the same position of all the series of voltages. In an example, a first series of voltage amplitudes is [1, −1, −1] and a second series of voltage amplitudes is [1, 1, −1]. Accordingly, the summing module 18 produces the summed result [2, 0, −2] (i.e., [(1+1), (−1+1), (−1+−1)]). In this example, the series of voltages are equal in length. The summing module 18 is coupled to the phase mapping module 20, which is configured to determine a correspondence between each of the summed voltage amplitudes and a symbol, the symbol including a direction (i.e., positive or negative) of phase rotation and an amount of phase change in a symbol constellation corresponding to the PDM method described above. The output of the phase mapping module 20 is a phase change and direction for each of the summed voltage amplitudes produced by the summing module 18. In one example, the summing module 18 includes a differential amplifier, where each channel is coupled to a resistor, each resistor being coupled to the V⁻ terminal of the differential amplifier, a resistor coupled between the V⁻ terminal and the output of the differential amplifier, and the V⁺ terminal coupled to ground.

The phase mapping module 20 is coupled to the phase modulator 24, which is configured to receive the output from the phase mapping module 20 and modulate a carrier waveform. The carrier waveform is produced by the source 22, which is coupled to the phase modulator 24. According to certain aspects, the phase modulator 24 includes a pulse-shaping filter, which is configured to receive the output of the phase mapping module 20 and control the phase modulator 24 to impose the PDM modulation scheme on the optical source 22 to generate a modulated optical signal 25. In various examples, the phase modulator 24 is an electro-optic modulator, and includes the optical source 22, such as a laser. In one example, the optical source 22 emits a continuous carrier waveform that is modulated in phase for each symbol of the output of the phase mapping module 20 on the carrier waveform. In some examples, the transmitter 10 also includes various optics such as one or more mirrors or lenses to output the modulated optical signal 25.

Figure 3:
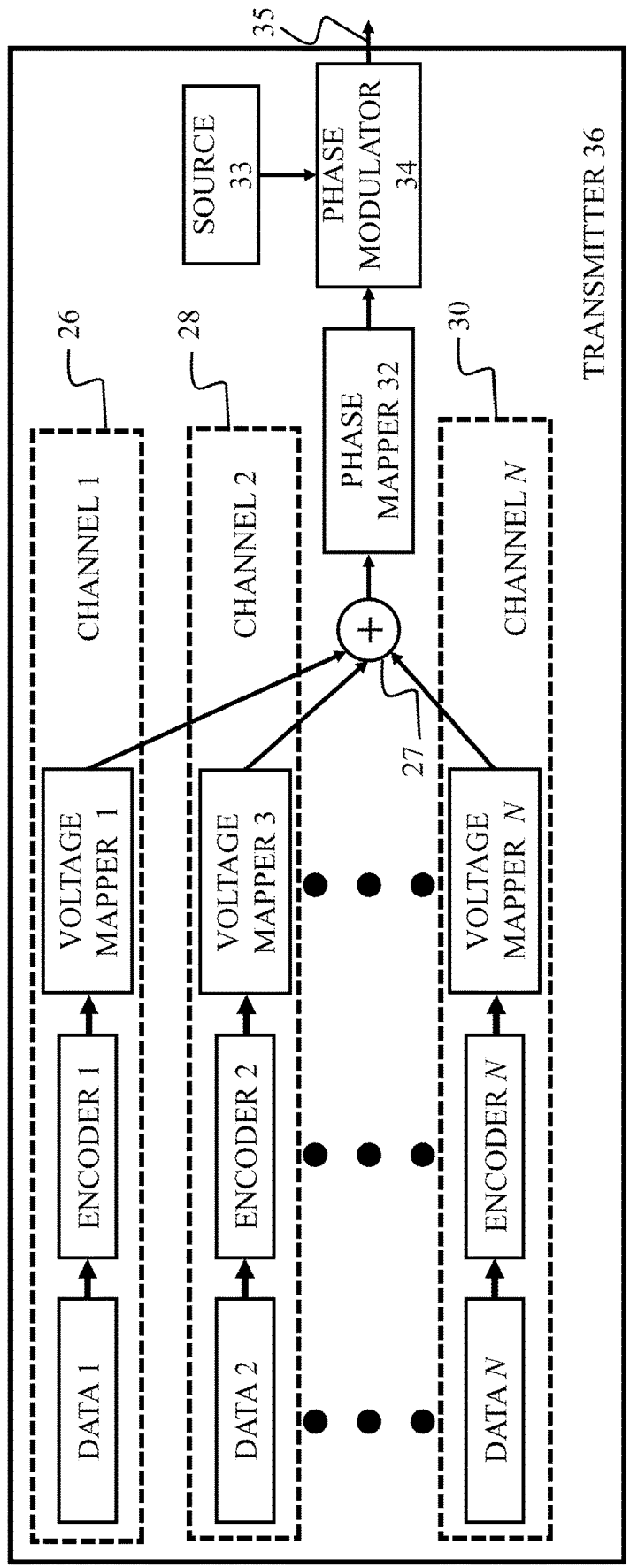
FIG. 3 herein is a functional block diagram of one example of a transmitter according to aspects and embodiments herein.

FIG. 3 shows a transmitter 36, which is similar to the transmitter 10. All description of the transmitter 36 is considered applicable to at least one embodiment of the transmitter 10 described above. The transmitter 36 is illustrated to depict a plurality of data channels 26, 28, 30, encoders, and voltage mappers. It is understood that the plurality of channels includes N channels, where N is an integer greater than 1. According to certain aspects, each data channel 26, 28, 30 carries data from a different user. In one example, each of the encoders is configured to encode data using the PDM method described above. Each data channel receives a data set, which is then encoded by an encoder (e.g., similar to the encoding module 12) and mapped to one or more different voltage amplitudes via a voltage mapper (e.g., similar to the voltage mapping module 14). The voltage amplitudes are then summed by a summer 27 (e.g., similar to the summation module 18), mapped to phase changes and directions with the phase mapper 32, and sent to the phase modulator 34 to be encoded onto a carrier waveform produced by the source 33 to produce a output the modulated optical signal 35 (e.g., similar to the phase modulator 24 and the source 22 producing the output signal 25). The transmitter 36, according to certain aspects, is included in a communications system. It is understood that a "communications system" and its variants as described herein includes embodiments with only a transmitter, only a receiver, and a transmitter in communication with a receiver.

Communications systems according to aspects and embodiments include N channels. N is limited by the number of codes available and the number of available phase states. This will be explained more fully below. The data in each channel is encoded with a code by an encoder (e.g., the encoding module 12). In other examples, Walsh or maximal length sequences codes are used. The encoded signal produced by the encoder in each channel is then converted to voltages by a voltage mapper (e.g., the voltage mapping module 16). Ones are mapped to −V Volt and zeros are mapped to +V Volt. The output of the voltage mappers are the associated encoded data sets mapped from bit space to voltage space. The outputs of the N voltage mappers are summed together (e.g., the summing module 18) and provided as inputs to a phase mapper (e.g., the phase mapping module 20). The phase mapper takes the voltage amplitudes, which vary in discrete intervals, from −N to N. The specific voltages are determined, in certain embodiments, according to the following criteria:

1. The maximum voltage is N Volts.
2. The minimum voltage is −N Volts.
3. The number of discrete voltages is (N+1).
4. For an odd number N, the discrete voltages are symmetric about zero; however, zero can never occur.
5. For an even number N, the discrete voltages are symmetric about zero and zero can occur.
6. Expected discrete voltages are given by the following sequence: [−N, −N+2, −N+4, . . . , −N+2N].
7. Without PDM, one phase state is required for each voltage; however, given that the voltages are symmetric about zero, the PDM encoding method is used to reduce the number of required phase states by a half.
8. For an odd number of channels, the number of phase states required is (N+1)/2. For example, data for 7 channels can be transmitted using four phase states or Quadrature Phase Shift Keying (QPSK).

The phase mapper converts amplitude changes to phase changes by mapping the voltages out of the summer to phase changes, using the PDM method. PDM uses both the amount of phase change and the direction of phase change to define a symbol; thereby reducing the number of phase states by a factor of two, due to the optical resonator (e.g., an etalon) having the ability to differentiate between a positive phase rotation and a negative phase rotation. Using PDM with BPSK modulation, two bits of information can be determined from every state change. One bit comes from the phase state change and the second bit is dependent on the direction of phase rotation to get to the new state; that is whether the rotation is in the positive or negative direction.

Figure 4:
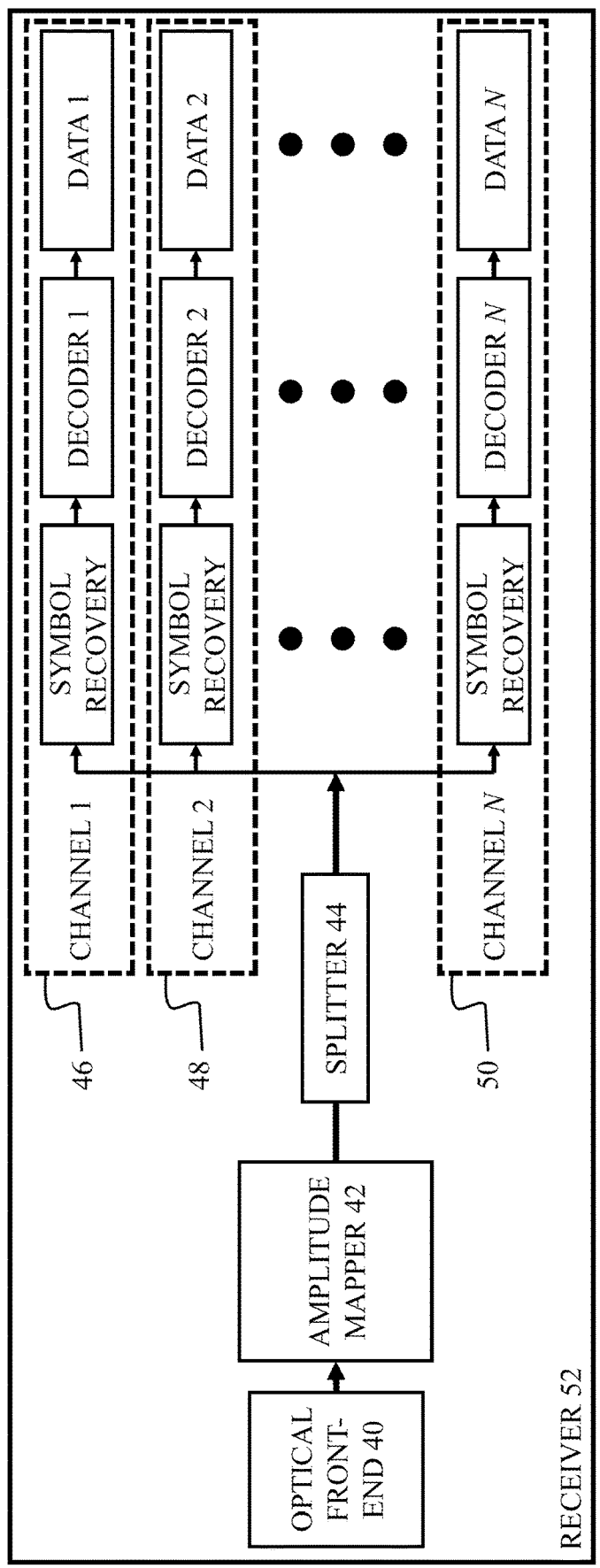
FIG. 4 is a functional block diagram of one example of a receiver according to aspects and embodiments herein.

FIG. 4 shows a receiver 52 configured to receive the encoded and modulated single wavelength optical signal from the transmitter 10, 36. The receiver 52 includes an optical front-end 40 coupled to an amplitude mapper 42, which is coupled to an electrical splitter 44. The splitter 44 is configured to separate the received optical signal into a plurality of channels 46, 48, 50. Each of the plurality of channels 46, 48, 50 includes symbol recovery and decoding processes to recover the data within each channel. In certain embodiments, an amplifier is coupled between the amplitude mapper 42 and the splitter 44. In other embodiments, the amplifier is included in the splitter 44. In other embodiments, the amplifier is included in the amplitude mapper 42.

Certain embodiments of the receiver 52 include a decoder in each of the N channels of the receiver 52, where the decoder is the reverse of the encoder in the corresponding channel of the transmitter 36. In one example, the optical front end 40 is a lens, the amplitude mapper 42 is an optical resonator such as an etalon or other cavity resonator and photodetector, and the splitter 44 is an electrical splitter. In certain embodiments, the splitter 44 is included in a splitting module.

In the example of a communications system using encoding as described above, the encoded signal enters the optical front-end 40 of the receiver 52 where it is converted to an electrical signal. The electrical signal is evaluated to determine where, when, and in what direction phase changes occur. In an example, the electrical signal is an intensity modulation output from an etalon in the optical front-end 40. The amplitude mapper 42 uses the phase information to regenerate the original amplitude changes needed for demodulation and symbol recovery. A more detailed discussion of an example of the symbol recovery process is provided below in relation to the description of FIG. 7. The regenerated signal is split N ways among the N processing paths by the splitter 44. In some examples, the N parallel processing paths in the back-end of the receiver 52 are identical except for the unique code associated with each one. The processing in each of the N processing paths is standard CDMA processing in one example. Other examples include modified CDMA processing. In certain examples, the amplitude mapper 42 is the reverse of the phase mapper 32, and converts the received phase change to amplitude changes.

The following is an example of a 7-channel CDMA communications system using a constant envelope phase-modulated optical signal. In this example, an embodiment of the transmitter 36 shown in FIG. 3, each channel of the plurality of channels 26, 28, 30 has a data set and a unique code. On the left side of the transmitter 36, the 7 data sets enter the communications system (N=7). The encoder (represented by the N individual encoders), codes each channel with a unique code. The N encoders output encoded data. The encoded bits are known as 'chips.' The channel data is encoded by sending the full code for a 0-bit and the inverted code for a 1-bit. In this example there are 8 code chips per bit; therefore, the number of chips generated is 8 times the number of data bits. In this case the number of data bits is 4, so the encoded data is 32 chips long for each channel.

TABLE 2

| | |
|---|---|
| Data Set 1: | 1 0 1 1 |
| Channel Code 1: | 1 1 1 1 1 1 1 1 |
| Encoded Data: | −1 −1 −1 −1 −1 −1 −1 −1 1 1 1 1 1 1 1 1 −1 −1 −1 −1 −1 −1 −1 −1 −1 −1 −1 −1 −1 −1 −1 −1 |
| Data Set 2: | 1 1 0 1 |
| Channel Code 2: | 1 −1 1 −1 1 −1 1 −1 |
| Encoded Data: | −1 1 −1 1 −1 1 −1 1 −1 1 −1 1 −1 1 −1 1 1 −1 1 −1 1 −1 1 −1 −1 1 −1 1 −1 1 −1 1 |

TABLE 2-continued

| | |
|---|---|
| Data Set 3: | 1 0 1 0 |
| Channel Code 3: | 1 1 −1 −1 1 1 −1 −1 |
| Encoded Data: | −1 −1 1 1 −1 −1 1 1 1 1 −1 −1 1 1 −1 −1 −1 −1 1 1 −1 −1 1 1 1 1 −1 −1 1 1 −1 −1 |
| Data Set 4: | 1 1 1 1 |
| Channel Code 4: | 1 −1 −1 1 1 −1 −1 1 1 |
| Encoded Data: | −1 1 1 −1 −1 1 1 −1 −1 1 1 −1 −1 1 1 −1 −1 1 1 −1 −1 1 1 −1 −1 1 1 −1 −1 1 1 −1 |
| Data Set 5: | 0 0 0 1 |
| Channel Code 5: | 1 1 1 1 −1 −1 −1 −1 |
| Encoded Data: | 1 1 1 1 −1 −1 −1 −1 1 1 1 1 −1 −1 −1 −1 1 1 1 1 −1 −1 −1 −1 −1 −1 −1 −1 1 1 1 1 |
| Data Set 6: | 0 1 0 0 |
| Channel Code 6: | 1 −1 1 −1 −1 1 −1 1 |
| Encoded Data: | 1 −1 1 −1 −1 1 −1 1 1 −1 1 −1 −1 1 −1 1 −1 1 −1 1 1 −1 1 −1 1 −1 1 −1 −1 1 −1 1 |
| Data Set 7: | 1 0 1 1 |
| Channel Code 7: | 1 1 −1 −1 −1 −1 1 1 |
| Encoded Data: | −1 −1 1 1 1 1 −1 −1 1 1 −1 −1 −1 −1 1 1 1 −1 −1 1 1 1 1 −1 −1 −1 −1 1 1 1 1 −1 −1 |

TABLE 3

| | |
|---|---|
| Encoded Data 1: | −1 −1 −1 −1 −1 −1 −1 −1 1 1 1 1 1 1 1 1 −1 −1 −1 −1 −1 −1 −1 −1 −1 −1 −1 −1 −1 −1 −1 −1 |
| Encoded Data 2: | −1 1 −1 1 −1 1 −1 1 −1 1 −1 1 −1 1 −1 1 1 −1 1 −1 1 −1 1 −1 1 1 −1 1 −1 1 −1 1 −1 |
| Encoded Data 3: | −1 −1 1 1 −1 −1 1 1 1 1 −1 −1 1 1 −1 −1 −1 −1 1 1 −1 −1 1 1 −1 1 1 1 1 −1 −1 1 1 −1 −1 |
| Encoded Data 4: | −1 1 1 −1 −1 1 1 −1 −1 1 1 −1 −1 1 1 −1 −1 1 1 −1 −1 1 1 −1 −1 1 1 −1 −1 1 1 −1 |
| Encoded Data 5: | 1 1 1 1 −1 −1 −1 −1 1 1 1 1 −1 −1 −1 −1 1 1 1 1 −1 −1 −1 −1 −1 −1 −1 −1 1 1 1 1 |
| Encoded Data 6: | 1 −1 1 −1 −1 1 −1 1 1 −1 1 −1 −1 1 −1 1 −1 1 −1 1 1 −1 1 −1 1 −1 1 −1 −1 1 −1 1 |
| Encoded Data 7: | −1 −1 1 1 1 1 −1 −1 1 1 −1 −1 −1 −1 1 1 1 −1 −1 1 1 1 1 −1 −1 −1 −1 1 1 1 1 −1 −1 |
| Summed Codes: | −3 −1 3 1 −5 1 −3 −1 1 7 −1 1 −1 1 1 −1 −1 −3 5 −1 −3 −1 −1 −3 −3 −1 −1 −3 −1 5 −3 −1 |

Table 2 includes the 4-bit data, 8-chip code and 32-bit encoded data for each channel. Once the data is encoded, the voltage mapper (i.e., voltage mappers 1–N) converts the bits from a logical representation to voltages, where a 1-bit maps to −1 Volt and a 0-bit maps to 1 Volt. The summer (i.e., the summer 27) sums the N encoded bit sequences. Table 3 includes the 7-channel encoded data sequences and their sum. The summed codes are to be transmitted by the transmitter 36. As described above by tables 2 and 3, the voltages can vary between −7 and 7 Volts for a 7 channel communications system. The phase mapper 32 then maps the amplitudes to phases using the PDM approach described above. In one example, the phase mapper 32 maps the amplitudes to phases by multiplying each amplitude in the sequence of voltage amplitudes by ($\pi/4$) radians.

The following is an example of the transmitter 10 or the transmitter 36 in a communications system using PDM with QPSK modulation and 7 CDMA encoded channels of data, that is N=7. The amount of phase rotation is expressed in terms of pi and the direction of rotation is expressed by the sign.

TABLE 4

| Amplitude (V) | Phase change and Direction |
|---|---|
| +1 | +pi/4 |
| +3 | +3pi/4 |
| +5 | +5pi/4 |
| +7 | +7pi/4 |

TABLE 5

| Amplitude (V) | Phase change and Direction |
|---|---|
| −1 | −pi/4 |
| −3 | −3pi/4 |
| −5 | −5pi/4 |
| −7 | −7pi/4 |

TABLE 6

| | |
|---|---|
| Transmitted Phases | −3pi/4 − pi/4 3pi/4 pi/4 −5pi/4 pi/4 −3pi/4 − pi/4 pi/4 7pi/4 − pi/4 pi/4 − pi/4 pi/4 pi/4 − pi/4 − pi/4 −3pi/4 5pi/4 − pi/4 −3pi/4 − pi/4 − pi/4 −3pi/4 −3pi/4 − pi/4 − pi/4 −3pi/4 − pi/4 5pi/4 −3pi/4 − pi/4 |

Table 4 describes positive code amplitudes mapped to positive phase changes for the 7 CDMA channels by the phase mapper 32. Table 5 describes negative code amplitudes mapped to negative phase changes for the 7 CDMA channels by the phase mapper 32. The phase mapper 32 provides both the phase change and the direction of phase change to the phase modulator 34. The source 33 (e.g., laser) is then phase-modulated by the phase modulator 34 to transmit the phases provided in Table 6 as the output 35 transmitted into free space as a constant envelope QPSK waveform.

TABLE 7

| | |
|---|---|
| Amplitude Mapper Output | −3 −1 3 1 −5 1 −3 −1 1 7 −1 1 −1 1 1 −1 −1 −3 5 −1 −3 −1 −1 −3 −3 −1 −1 −3 −1 5 −3 −1 |

Referring to FIG. 4, the optical front-end 40 of the receiver 52 provides the phase change and phase change direction information to the amplitude mapper 42. The amplitude mapper 42 converts the phase information, shown above, back to amplitude variations. Table 7 is the output of the amplitude mapper 42 according to the example above. In one example, conventional CDMA processing is applied to decode the phase information into amplitude variations. In another example, modified CDMA processing applied to decode the phase information into amplitude variations. Each channel multiplies the output of the amplitude mapper 42 by its unique code, integrates and scales the result to recover the transmitted data. The amplitude mapper 42 maps the phase change and direction back to the output of the summer 27 in the receiver 52.

TABLE 8

| Channel 1: | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 1 Code: | 1 1 1 1 1 1 1 1 1 1 1 1 1 1 1 1 1 1 1 1 1 1 1 1 1 1 1 1 1 1 1 1 |
| Product: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| Integrate over code length: | −8 8 −8 −8 |
| Average: | −1 1 −1 −1 |
| User 1 Bits: | 1 0 1 1 |

TABLE 8-continued

Channel 2:

| | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 2 Code: | 1 −1 1 −1 1 −1 1 −1 1 −1 1 −1 1 −1 1 −1 −1 1 −1 1 −1 1 −1 1 −1 1 −1 1 −1 1 −1 |
| Product: | −3 1 3 −1 −5 −1 −3 1 1 −7 −1 −1 −1 −1 1 1 3 5 1 −3 1 −1 3 −3 1 −1 3 −1 −5 −3 1 |
| Integrate over code length: | −8 −8 8 −8 |
| Average: | −1 −1 1 −1 |
| User 2 Bits: | 1 1 0 1 |

Channel 3:

| | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 3 Code: | 1 1 −1 −1 1 1 1 −1 −1 1 1 1 −1 −1 1 1 −1 −1 1 1 1 −1 −1 1 1 1 −1 −1 1 1 1 −1 |
| Product: | −3 −1 −3 −1 −5 1 3 1 1 7 1 −1 −1 1 1 −1 −3 −5 1 −3 −1 1 3 −3 −1 1 3 −1 5 3 1 |
| Integrate over code length: | −8 8 −8 8 |
| Average: | −1 1 −1 1 |
| User 3 Bits: | 1 0 1 0 |

Channel 4:

| | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 4 Code: | 1 −1 −1 1 1 −1 −1 1 1 −1 −1 1 1 −1 −1 1 −1 1 1 −1 −1 1 1 −1 −1 1 1 −1 −1 1 1 |
| Product: | −3 1 −3 1 −5 −1 3 −1 1 −7 1 1 −1 −1 −1 −1 3 −5 −1 −3 1 1 −3 −3 1 1 −3 −1 −5 3 −1 |
| Integrate over code length: | −8 −8 −8 −8 |
| Average: | −1 −1 −1 −1 |
| User 4 Bits: | 1 1 1 1 |

Channel 5:

| | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 5 Code: | 1 1 1 1 −1 −1 −1 −1 1 1 1 1 −1 −1 −1 −1 1 1 −1 −1 −1 1 1 1 1 −1 −1 −1 −1 1 1 |
| Product: | −3 −1 3 1 5 −1 3 1 1 7 −1 1 1 −1 −1 1 −3 5 −1 3 1 1 3 −3 −1 −1 −3 1 −5 3 1 |
| Integrate over code length: | 8 8 8 −8 |
| Average: | 1 1 1 −1 |
| User 5 Bits: | 0 0 0 1 |

Channel 6:

| | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 6 Code: | 1 −1 1 −1 −1 1 1 −1 1 1 −1 1 −1 −1 1 1 −1 1 −1 1 1 −1 1 −1 1 1 −1 1 −1 |
| Product: | −3 1 3 −1 5 1 3 −1 1 −7 −1 −1 1 1 −1 −1 1 3 5 1 3 −1 1 −3 −3 1 −1 3 1 5 3 −1 |
| Integrate over code length: | 8 −8 8 8 |
| Average: | 1 −1 1 1 |
| User 6 Bits: | 0 1 0 0 |

Channel 7:

| | |
|---|---|
| Code Sum: | −3 −1 3 1 −5 1 −3 −1 1 7 −1 1 −1 1 1 −1 −1 −3 5 −1 −3 −1 −1 −3 −3 −1 −1 −3 −1 5 −3 −1 |
| User 7 Code: | 1 1 −1 −1 −1 −1 1 1 1 1 −1 −1 −1 −1 1 1 −1 −1 −1 −1 1 1 1 1 −1 −1 −1 −1 1 1 1 |
| Product: | −3 −1 −3 −1 5 −1 −3 −1 1 7 1 −1 1 −1 1 −1 −1 1 −3 −5 1 3 1 −1 −3 −3 −1 1 3 1 −5 −3 −1 |
| Integrate over code length: | −8 8 −8 −8 |
| Average: | −1 1 −1 −1 |
| User 7 Bits: | 1 0 1 1 |

To recover data from the signal received by the optical front-end 40, certain embodiments include a method for bit recovery process for the first two bits in each of a plurality of channels. Using Table 8 as an example, the total number of channels is 8. Accordingly, the method includes, for each of the 8 channels:

1. Starting with the code sum, which is the output of the summer 27 in the receiver 52.
2. The user or channel code.
3. Product. This is the product of the user code and the code sum.
4. Integrate over code length (8 in this case).
5. Average: divide the result of Step 4 by the code length (8 in this case).
6. Convert to Bits: Convert the voltage in Step 5 back to the original bits.

Figure 5:
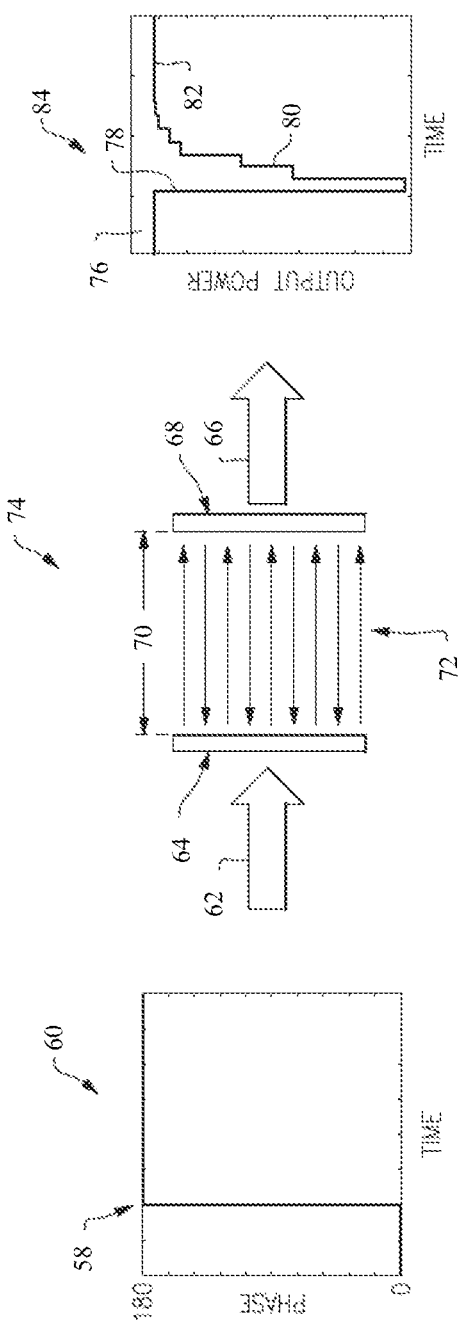
FIG. 5 is a functional block diagram an optical receiver according to aspects and embodiments herein.

Referring to FIG. 5, in certain examples an etalon 74 is a component having a pair of parallel semi-reflective surfaces 64, 68 that may include a dielectric material in between, and has a characteristic resonant frequency associated with a certain wavelength of light based upon the spacing (i.e., dimension 70) between the semi-reflective surfaces. The surfaces 64, 68 are semi-reflective and also semi-transmissive, in that they allow some light through, and therefore the arriving modulated optical signal 62 (e.g., similar to the output signal 35) may be allowed into the etalon 74 and may resonate inside the etalon (i.e., in the interior 72 between the two semi-reflective surfaces 64, 68). Additionally, some of the light resonating inside is allowed out of the etalon 74 (through at least one of the semi-transmissive surfaces). Light emerging from the etalon 74 is shown, for example, as the output optical signal 66.

The optical signal 62 received by the etalon 74 establishes a steady-state energy-conserving condition in which optical signal energy continuously arrives at the etalon 74, adds to the built-up resonating energy existing inside the etalon 74, and emerges from the etalon 74 at a constant rate. If the frequency, amplitude, or phase of the arriving optical signal 62 changes, this change causes a temporary disruption to the resonance inside the etalon 74 and the light intensity emerging from the etalon 74 is also disrupted, until a steady state condition is re-established. Accordingly, a change in phase, frequency, or amplitude of the arriving optical signal 62 causes a change in intensity of the output optical signal 66. Thus, the etalon functions as a modulation converter, for the optical signal 62. The output optical signal 66 may therefore carry the same information content as the arriving optical signal 62, but in an intensity modulated form, rather than a phase modulated form, for example.

FIG. 5 shows a graph 60 of the arriving modulated optical signal 62, showing a phase change in the optical signal 62. The graph 60 plots the phase (vertical axis) of the optical signal 66 over time (horizontal axis), showing a phase transition of pi (180 degrees) at point 58. FIG. 5 also shows a graph 84 of optical signal intensity (as output power) emerging from the etalon 74 during the phase transition in the received optical signal 62. At region 76 the etalon 74 is in a steady-state resonance condition wherein a steady intensity of light emerges. At point 78, corresponding to point 58 in the graph 60, a phase transition occurs in the arriving optical signal 62, temporarily disrupting the steady-state and causing a drop in the emerging light intensity. During successive reflections inside the etalon 74, and indicated region 80 in the graph 84, resonance is re-establishing, and the emerging light intensity increases until, at point 82, a steady intensity of light emerges when the etalon 74 has returned to a steady-state condition. Thus, variations in the intensity of the output optical signal 66 from the etalon 74 indicate that a transition occurred in the arriving optical signal 62, such as a phase transition due to phase modulation of the optical signal 62.

The etalon 74 may have varying levels of reflectivity of the semi-reflective surfaces 64, 68. In certain examples, the reflectivity may be expressed as a fraction of light amplitude reflected back into the interior 72, or may be expressed as a fraction of light intensity reflected back into the interior 72. The reflectivity of each of the first and second semi-reflective surfaces 64, 68 may be the same or different, and may be any suitable value for a particular implementation. The etalon 74 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

Figure 6:
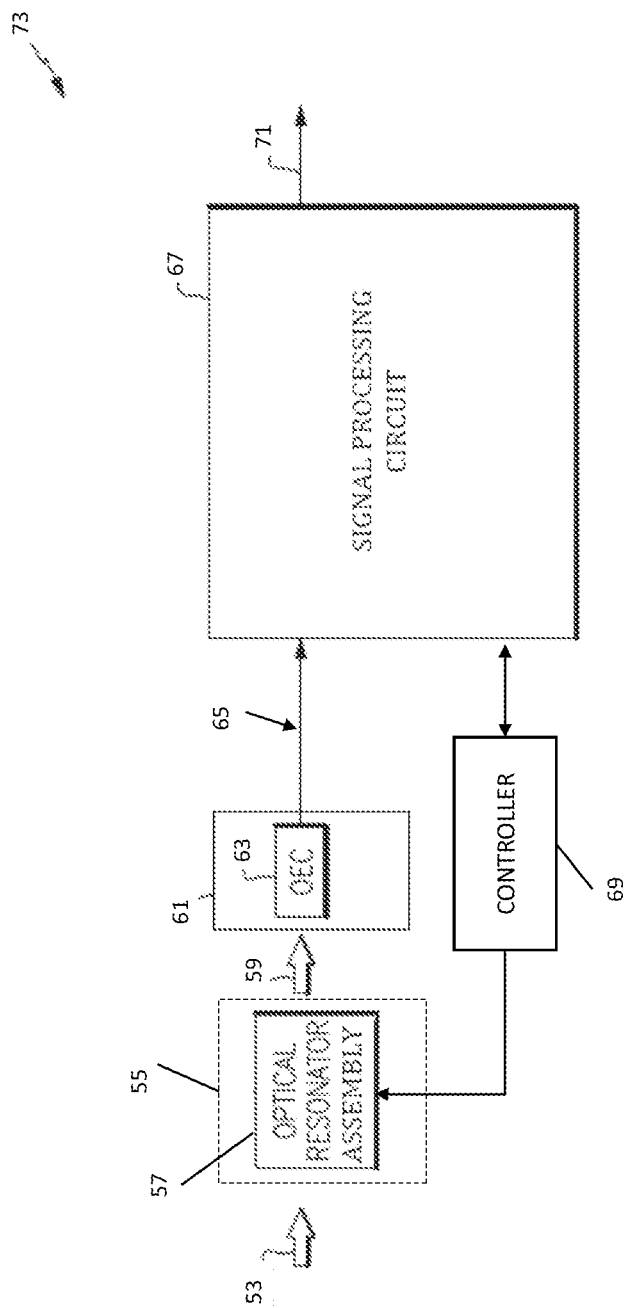
FIG. 6 is a schematic diagram of an optical resonator, including a graph of received signal phase and a graph of output intensity of the optical resonator according to aspects and embodiments herein.

FIG. 6 is a block diagram of one example of an optical receiver (e.g., similar to the receiver 52) generally indicated at 73. The optical receiver 73 receives a modulated optical signal 53 transmitted along a free space signal path (e.g., free space optical, FSO), a fiber coupling, or another waveguide system from a transmitter (e.g., the transmitter 63). The optical receiver 73 includes a demodulator 57 that includes an optical resonator assembly 57. The optical receiver 73 further includes a detector assembly 61 including at least one optical-electrical converter (OEC) 63, and a signal processing circuit 67. In certain examples, the detector assembly 61 and the signal processing circuit 67 may be collectively referred to as a detector. The detector assembly 61 and the signal processing circuit 67 may be separate components or may be part of a common module. The optical resonator assembly 57 is positioned to receive the modulated optical signal 53 (e.g., similar to the modulated signal 35 and the modulated signal 62) and to produce an output optical signal 59 (e.g., similar to the output signal 66) that has characteristics representative of the modulation of the modulated optical signal 53, as discussed further below. The detector assembly 61 receives the output optical signal 59 from the optical resonator assembly 57 and the at least one OEC 63 converts the optical signal 59 into an electrical signal 65 that can be processed by the signal processing circuit 67 to produce a decoded information signal 71. The decoded information signal 71 may include the information that was encoded on the modulated optical signal 53 by the modulation of the modulated optical signal 53. The OEC 63 may include one or more photodiodes, for example, or other components capable of transforming an optical signal into an electrical signal. The signal processing circuit 67 may include various components, as will be understood by those skilled in the art, such as analog-to-digital converters, filters, amplifiers, controllers, etc., to condition and process the electrical signals received from the detector assembly 61 to produce the decoded information signal 71. The optical receiver 73 may further include a controller 69 that may be coupled to the optical resonator assembly 57 and configured to adjust parameters of the optical resonator assembly 57 to maintain a particular operating point of one or more optical resonators included in the optical resonator assembly 57, as discussed in more detail below.

In certain examples, the optical resonator assembly 57 includes one or more optical resonators, as described in embodiments herein, configured to convert the modulation of the modulated optical signal 53 into intensity modulation of the output optical signal 59. The modulated optical signal 53 may be phase modulated, amplitude modulated, and/or frequency modulated. As used herein, the term "optical resonator" refers to a component capable of sensing variations, such as frequency variations, amplitude variations, or phase variations in the received optical signal 53. Examples of optical resonators may include Fabry-Perot etalons or other types of optical resonators. Each optical resonator in the optical resonator assembly 57 converts the modulation of the arriving/input optical signal 53 in part by interaction of the arriving optical signal 53 with optical energy built-up in the resonator. In certain embodiments, the arriving/input optical signal 53 is encoded and transmitted by a transmitter (e.g., transmitter 36), received at an optical front end (e.g., front end 40) of a receiver (e.g., receiver 52), which is then is received by an optical resonator (e.g., etalon 74), which is part of an optical assembly (e.g., assembly 55). Those skilled in the art will appreciate that other types of optical resonators (e.g., micro-ring resonators or optical loops) can be operated according to similar principles. For example, optical signal energy accumulated in the loop/micro-ring may constructively or destructively interfere with itself, at certain frequencies (wavelengths), and such constructive or destructive interaction may be disturbed by a phase change in an arriving optical signal 62. Accordingly, phase changes in the arriving optical signal 62 may be detected and interpreted to demodulate the arriving optical signal 62. Further, the optical resonator may respond similarly to amplitude modulated or frequency modulated input optical signals.

Figure 7:
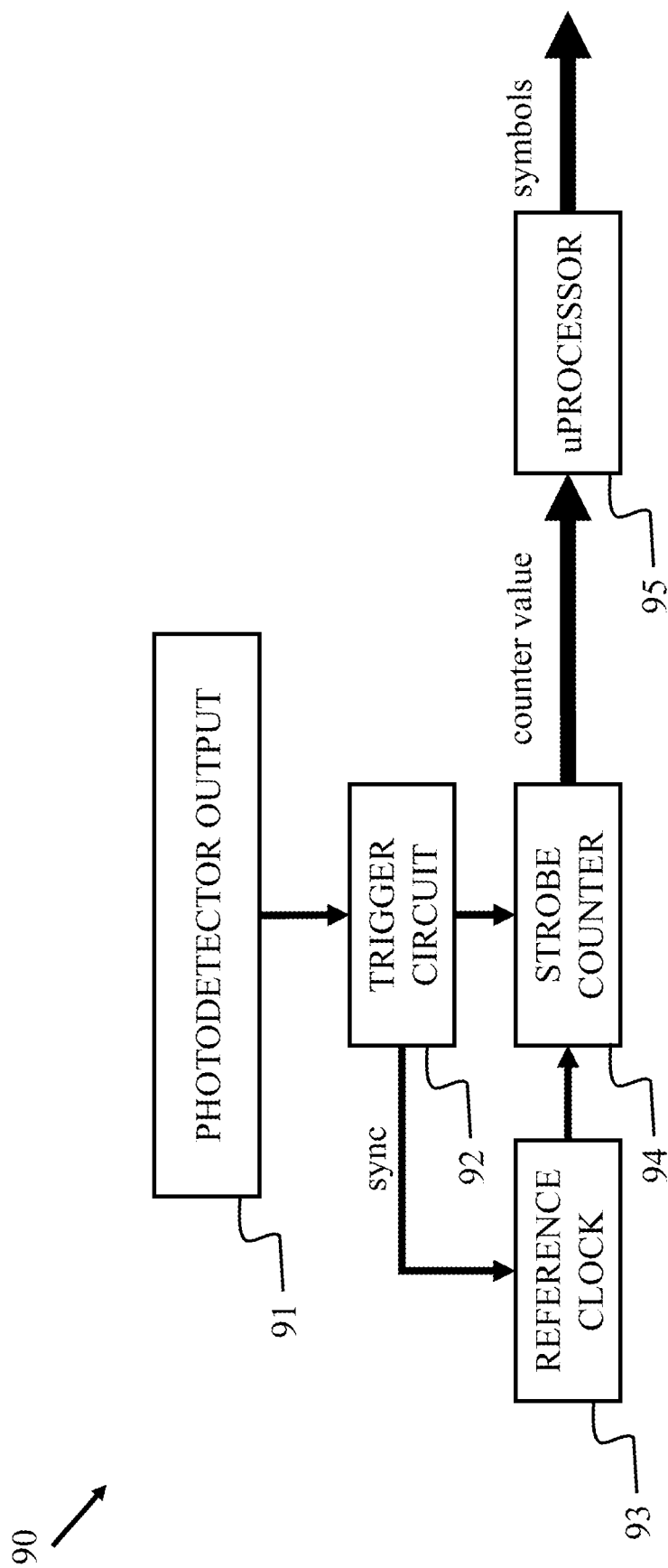
FIG. 7 is a functional block diagram a symbol recovery process according to aspects and embodiments herein.

FIG. 7 illustrates a symbol recovery process generally indicated at 90. The symbol recovery process 90, in certain embodiments, is utilized in each of a plurality of channels in a receiver (e.g., the receiver 52). The recovery process 90 begins with a modulated analog signal (e.g., output optical signal 66) output from an optical resonator (e.g., etalon 74) and converted to a digital signal by a photodetector. The output 91 of the photodetector is provided to a trigger circuit 92, which measures the time difference between the intensity changes from the output of the photodetector (e.g., the signal 65). The trigger circuit 92 provides a sync signal to a reference clock 93, which provides a clock value to a strobe counter 94, which also receives an input from the trigger circuit 92. The strobe counter 94 produces a counter value, which is provided to a microprocessor 95 to process the photodetector output 91 based on the counter value. Intensity changes are measured from the time the output goes from full output (e.g., the region 76), to extinguished, and then back to full output. These intensity changes correspond to the phase changes in the optical carrier (e.g., the signal 62). From this time difference, the number of 1-bits and 0-bits can be determined.

The response and operation of various examples of etalons and other optical resonators in different tuning states to different phase (and other modulation) transitions in an arriving optical signal are discussed in more detail in commonly-owned U.S. Patent Publication No. 2018-0145764 titled "DEMODULATION OF QAM MODULATED OPTICAL BEAM USING FABRY-PEROT ETALONS AND MICRORING DEMODULATORS" and U.S. Patent Publication No. 2018-0102853 titled "SYSTEMS AND METHODS FOR DEMODULATION OF PSK MODULATED OPTICAL SIGNALS," each of which is herein incorporated by reference in its entirety for all purposes.

Figure 8:
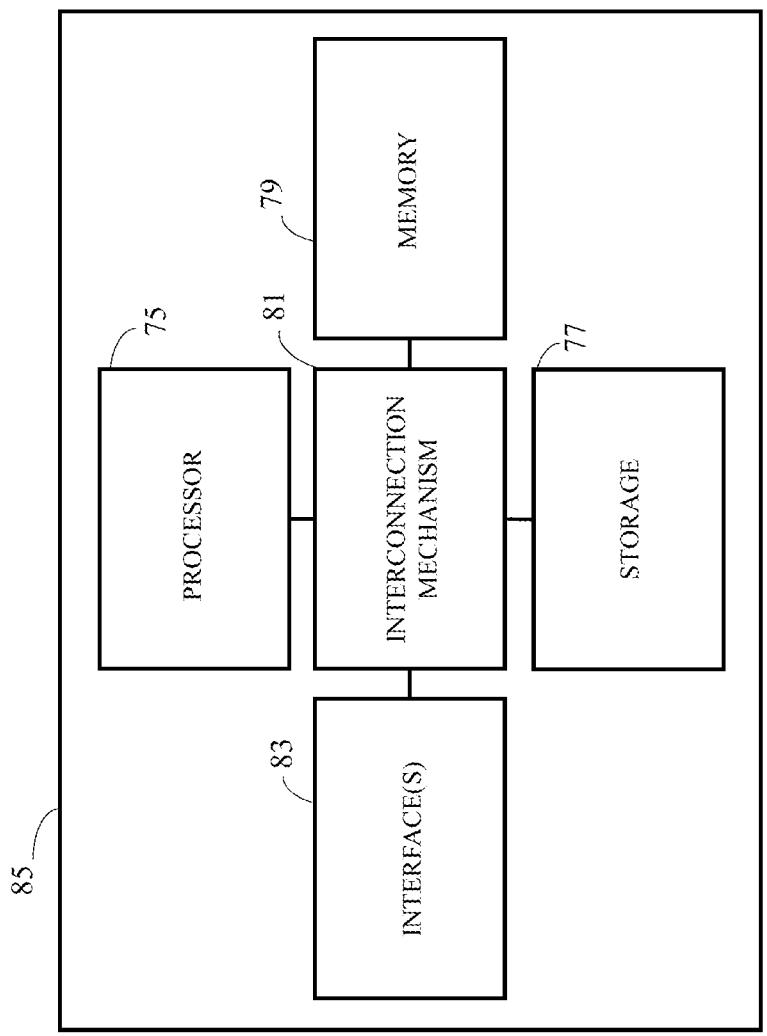
FIG. 8 is a functional block diagram of a computing system that may be configured to implement various examples of aspects and embodiments herein.

FIG. 8 illustrates one example of a computing system 85 that implements software routines corresponding to various components of a controller. The computing system 85 may additionally control one or more of the transmitters 10, 36 and receivers 52 disclosed herein. In an example, the computing system 85 includes at least one processor 75, at least one data store 77, at least one memory 79, and one or more interfaces 83, such as a system interface and/or a user interface.

In FIG. 8, the processor 75 is coupled to the data storage 77, memory 79, and the various interfaces 83. The memory 79 stores programs (e.g., sequences of instructions coded to be executable by the processor 75) and data during operation of the computing system 85. In an example, the memory 79 is a relatively high performance, volatile, random access memory such as a dynamic random access memory ("DRAM") or static memory ("SRAM"). In another example, the memory 79 includes any device for storing data, such as a disk drive or other nonvolatile storage device. Various examples organize the memory 79 into particularized and, in some cases, unique structures to perform the functions disclosed herein. These data structures are sized and organized to store values for particular data and types of data.

The data storage 77 includes a computer readable and writeable data storage medium configured to store non-transitory instructions and other data, and include nonvolatile storage media, such as optical or magnetic disk, ROM or flash memory. In an example, the instructions include executable programs or other code that is executed by the at least one processor 75 to perform any of the functions described herein.

In various examples, the computing system 85 includes one or more interface(s) 83, such as a system interface and/or a user interface. Such a user interface includes a graphical user interface (GUI) or a non-graphical interface such as a panel including control buttons and/or switches. Each of the interface(s) 83 is configured to exchange, e.g., send or receive, data with other components of the computing system 85, or other devices in communication with the computing system 85. According to various examples, the interface components 83 include hardware components, software components, or a combination of hardware and software components.

In certain examples, components of the interface(s) 83 couple the processor 75 to one or more other components of the communication systems disclosed herein. The processor 75 then provides one or more control signals to any such components and manage the operation of such components, as described above. In an example, processor 75 is configured to control the encoding module 12, the mapping module 14, the source 22, and the phase modulator 24 of the transmitter 10. Likewise, the processor 75, or another processor similar to the processor 75 controls one or more of the optical front end 40, amplitude mapper 42, splitter 44, as well as the symbol recovery and decoding in each of the channels 46, 48, 50 of the receiver 52.

In another example, a user interface includes hardware and/or software components that allow a corresponding transmitter or receiver in which the computing system 85 is incorporated to communicate with an external entity, such as a user. These components are configured to receive information from user interactions with the user interface. Examples of the components that are employed within the user interface include buttons, switches, light-emitting diodes, touch screens, displays, stored audio signals, voice recognition, or an application on a computer-enabled device in communication with the computing system 85. Data received at the various interfaces is provided to the processor 75, as illustrated in FIG. 8. Communication coupling (e.g., shown interconnection element 81) between the processor 75, memory 79, data storage 77, and interface(s) 83 is implemented as one or more physical busses in conformance with standard, proprietary, or specialized computing bus technologies.

The processor 75 performs a series of instructions that result in manipulated data that is stored in and retrieved from the data storage 77, as discussed above. In various examples, the series of instructions result in the generation of a constant envelope phase-modulated optical signal and the demodulation and encoding that accompanies receiving such a signal. The processor 75 is any type of processor, multiprocessor or controller, whether commercially available or specially manufactured. In an example, the processor 75 includes a commercially available processor, such as a processor manufactured by INTEL, AMD, MOTOROLA, or FREESCALE. In some examples, the processor is implemented on a field-programmable array (FPGA) or other programmable electronic device. In some examples, the processor 75 is configured to execute a program implemented on an operating system such as Windows by Microsoft Corporation or Mac OS X by Apple Incorporated. The examples are not limited to a specific programming language and any suitable programming language could be used. Accordingly, the functional components disclosed herein exemplarily include a wide variety of elements, e.g. specialized hardware, executable code, data structures or objects, that are configured to perform the functions described herein. In an example, computing system 85 communicates with and control any of the systems described above from a remote location. The remote location is located on a Local Area Network (LAN), on a server accessed over the Internet, or in a cloud environment.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

What is claimed is:

1. A communications system using a constant envelope phase-modulated optical signal comprising:
    a transmitter, comprising:
    an optical source configured to provide a carrier waveform;
    an encoding module configured to encode data from a plurality of channels as a plurality of symbol sequences;
    a mapping module configured to convert the plurality of symbol sequences to a plurality of phase state changes and a plurality of directions according to a path-dependent phase modulation scheme by determining a plurality of positive and/or negative phase change rotations in a symbol constellation corresponding to the path-dependent phase modulation scheme and a plurality of voltage amplitudes;
    a phase modulator configured to modulate the carrier waveform with the plurality of phase state changes and directions to generate the constant envelope phase-modulated optical signal; and
    a lens that emits the constant envelope phase-modulated signal.

2. The system of claim 1 wherein the mapping module is further configured to convert the plurality of symbol sequences to the plurality of phase state changes and the plurality of directions by:
    summing the plurality of symbol sequences into a summed sequence of symbols, wherein each sequence of the plurality of sequences is of equal length.

3. The system of claim 2 wherein the mapping module is further configured to convert the plurality of symbol sequences to the plurality of phase state changes and the plurality of directions by:
    converting each symbol in the summed sequence of symbols to a phase state change and a direction included in the plurality of phase state changes and the plurality of directions.

4. The system of claim 3 wherein the mapping module is further configured to:
    determine the plurality of phase state changes and the plurality of directions by:
    determining the total number of channels in the plurality of channels, where the total number of channels is N;
    calculating a sequence of N+1 discrete voltage amplitudes, the sequence of voltage amplitudes having the form: V=[−N, −N+2, −N+4, ..., −N+2N] symmetric about zero, including zero if N is even and excluding zero if N is odd; and
    multiplying each amplitude in the sequence of voltage amplitudes by ($\pi/4$) radians, where sgn(V) indicates a positive or negative phase rotation in the symbol constellation corresponding to the path-dependent phase modulation scheme.

5. The system of claim 1 further comprising an optical receiver comprising:
    at least one optical resonator configured to receive the emitted constant envelope phase-modulated optical signal and provide an intensity-modulated signal indicative of the modulation of the emitted constant envelope phase-modulated optical signal.

6. The system of claim 5 wherein the at least one optical resonator includes an etalon or a micro-ring.

7. The system of claim 5 wherein the optical receiver further comprises:
    an amplitude mapper configured to process the intensity-modulated signal into a received plurality of phase state changes and a received plurality of directions, and convert the received plurality of phase state changes and the received plurality of directions to an output including a plurality of amplitude changes.

8. The system of claim 7 wherein the optical receiver further comprises:
    a splitting module configured to, for each channel of the plurality of channels, multiply the output of the amplitude mapper by a unique code to produce a result, integrate the result, and scale the integrated result.

9. The system of claim 1 wherein the encoding module encodes the data in each channel of the plurality of data channels using Code Division Multiple Access (CDMA), Walsh encoding, or maximal length sequences.

10. A communications method comprising the acts:
    providing a carrier waveform;
    encoding data from a plurality of channels as a plurality of symbol sequences;
    converting the plurality of symbol sequences to a plurality of phase state changes and a plurality of directions according to a path-dependent phase modulation scheme by determining a plurality of positive and/or negative phase change rotations in a symbol constellation corresponding to the path-dependent phase modulation scheme and a plurality of voltage amplitudes;
    modulating the carrier waveform with the plurality of phase state changes and directions to generate the constant envelope phase-modulated optical signal; and
    emitting the constant envelope phase-modulated optical signal.

11. The method of claim 10 wherein converting the plurality of symbol sequences to the plurality of phase state changes and the plurality of directions comprises:
    summing the plurality of symbol sequences into a summed sequence of symbols, wherein each sequence of the plurality of sequences is of equal length.

12. The method of claim 11 wherein converting the plurality of symbol sequences to the plurality of phase state changes and the plurality of directions further comprises:
    converting each symbol in the summed sequence of symbols to a phase state change and a direction included in the plurality of phase state changes and the plurality of directions.

13. The method of claim 12 converting the plurality of symbol sequences to the plurality of phase state changes and the plurality of directions further comprises:
  determining the plurality of phase state changes and the plurality of directions by:
  determining the total number of channels in the plurality of channels, where the total number of channels is N;
  calculating a sequence of N+1 discrete voltage amplitudes, the sequence of voltage amplitudes having the form: V=[−N, −N+2, −N+4, . . . , −N+2N] symmetric about zero, including zero if N is even and excluding zero if N is odd; and
  multiplying each amplitude in the sequence of voltage amplitudes by ($\pi/4$) radians, where sgn(V) indicates a positive or negative phase rotation in the symbol constellation corresponding to the path-dependent phase modulation scheme.

14. The method of claim 10 further comprising:
  receiving the emitted constant envelope phase-modulated optical signal; and
  providing an intensity-modulated signal indicative of the modulation of the emitted constant envelope phase-modulated optical signal.

15. The method of claim 14 further comprising:
  processing the intensity-modulated signal into a received plurality of phase state changes and a received plurality of directions; and
  converting the received plurality of phase state changes and the received plurality of directions to an output including a plurality of amplitude changes.

16. The method of claim 15 further comprising:
  for each channel of the plurality of channels, multiplying the output by a unique code to produce a result;
  integrating the result; and
  scaling the integrated result.

17. The method of claim 10 wherein encoding the data comprises:
  encoding the data in each channel of the plurality of data channels using Code Division Multiple Access (CDMA), Walsh encoding, or maximal length sequences.

18. The method of claim 10 wherein encoding the data comprises encrypting the data.

* * * * *